United States Patent [19]

Nakayama et al.

[11] Patent Number: 4,686,686
[45] Date of Patent: Aug. 11, 1987

[54] LINE EQUALIZER OPERABLE IN RESPONSE TO AN INPUT SIGNAL OF A VARIABLE DATA RATE

[75] Inventors: Kenji Nakayama; Yayoi Takeuchi, both of Tokyo, Japan

[73] Assignee: NEC Corporation, Tokyo, Japan

[21] Appl. No.: 772,538

[22] Filed: Sep. 4, 1985

[30] Foreign Application Priority Data

Sep. 4, 1984 [JP] Japan .................. 59-184815

[51] Int. Cl.[4] .................................... H03K 5/159
[52] U.S. Cl. ..................... 375/11; 333/18; 364/724
[58] Field of Search ............ 375/11, 12, 13, 14, 375/15; 333/18, 28 R; 364/724; 370/84, 85

[56] References Cited

U.S. PATENT DOCUMENTS

| | | | |
|---|---|---|---|
| 4,365,338 | 12/1980 | McRae et al. | 375/12 |
| 4,453,143 | 6/1984 | Bennett | 333/28 R |
| 4,459,698 | 7/1984 | Yumoto et al. | 375/16 |
| 4,555,788 | 11/1955 | Merrill | 375/11 |

Primary Examiner—Robert L. Griffin
Assistant Examiner—Stephen Chin
Attorney, Agent, or Firm—Sughrue, Mion, Zinn, Macpeak, and Seas

[57] ABSTRACT

In a line equalizer responsive to an input signal of a variable data rate for producing an equalizer output signal, a control circuit (12) supplies an equalizer circuit (11) with a selection signal (SEL) which is determined by the data rate and an output level of the equalizer output signal to select a frequency-gain characteristic that is matched with the line loss characteristic of a line. The equalizer circuit is implemented by a switched capacitor circuit and samples the input signal via a clock signal (CK) a clock frequency of which is varied by a clock signal controller (51) in consideration of the data rate. An additional equalizer circuit may be connected in cascade to the equalizer circuit and controlled by an additional control signal determined by the data rate and the output level. In this event, the selection signal may be determined only by the output level with the clock signal left out of consideration.

3 Claims, 8 Drawing Figures

4,686,686

LINE EQUALIZER OPERABLE IN RESPONSE TO AN INPUT SIGNAL OF A VARIABLE DATA RATE

BACKGROUND OF THE INVENTION

This invention relates to a line equalizer for use in automatically equalizing a line loss characteristic of a subscriber line.

A conventional line equalizer of the type described is proposed by Suzuki et al in IEEE Transactions on Communications, Vol. COM-30, No. 9, pages 2074–2082, and serves to equalize a line loss characteristic in response to an input signal given through a subscriber line. The line loss characteristic is variable in dependency upon temperature, humidity, and the like. The line equalizer is implemented by a switched capacitor circuit which has a plurality of frequency-gain characteristics corresponding to the variation of the line loss characteristic. The switched capacitor circuit uses a plurality of capacitors to provide the plurality of the frequency-gain characteristics.

Such a switched capacitor circuit is very effective when the bit rate or the data rate of the input signal is constant.

It is to be noted that various kinds of subscriber lines are used in a practical communication system to transmit data signals therethrough at different data rates or bit rates, such as for example, 3.2 kb/s, 6.4 kb/s, 12.8 kb/s, 64 kb/s, or 200 kb/s.

No consideration is directed to the case where the line equalizer is applied to such various subscriber lines of different data rates. Accordingly, a wide variety of switched capacitor circuits must be prepared so as to match the frequency-gain characteristics with the respective subscriber lines. Provision of such various switched capacitor circuits is very troublesome because the switched capacitor circuits must be individually manufactured.

In order to provide the frequency-gain characteristics for the respective subscriber lines through the use of a single line equalizer, a great number of capacitors would be formed in a semiconductor chip by an integrated circuit technique. This inevitably results in an increase of size in the semiconductor chip.

SUMMARY OF THE INVENTION

It is an object of this invention to provide a line equalizer which can favorably and readily cope with subscriber lines having different data rates.

It is another object of this invention to provide a line equalizer of the type described, wherein many frequency-gain characteristics can be realized by the use of a small number of capacitors.

The line equalizer to which this invention is applicable is responsive to an input signal supplied through a line having a line loss characteristic and produces an equalizer output signal. The line equalizer comprises a switched capacitor circuit having a plurality of frequency-gain characteristics for equalizing the input signal to produce a circuit output signal by selecting one of the frequency-gain characteristics in response to a selection signal and by sampling the input signal in response to a clock signal. Signal producing means is provided for producing the circuit output signal as the equalizer output signal. According to this invention, the line equalizer is responsive to an input signal of variable data rate and comprises selection signal supplying means responsive to the input and the equalizer output signals and coupled to the switched capacitor circuit for supplying the switched capacitor circuit with the selection signal in consideration of the variable data rate and the equalizer output signal.

DESCRIPTION OF THE PREFERRED EMBODIMENTS

Figure 1:
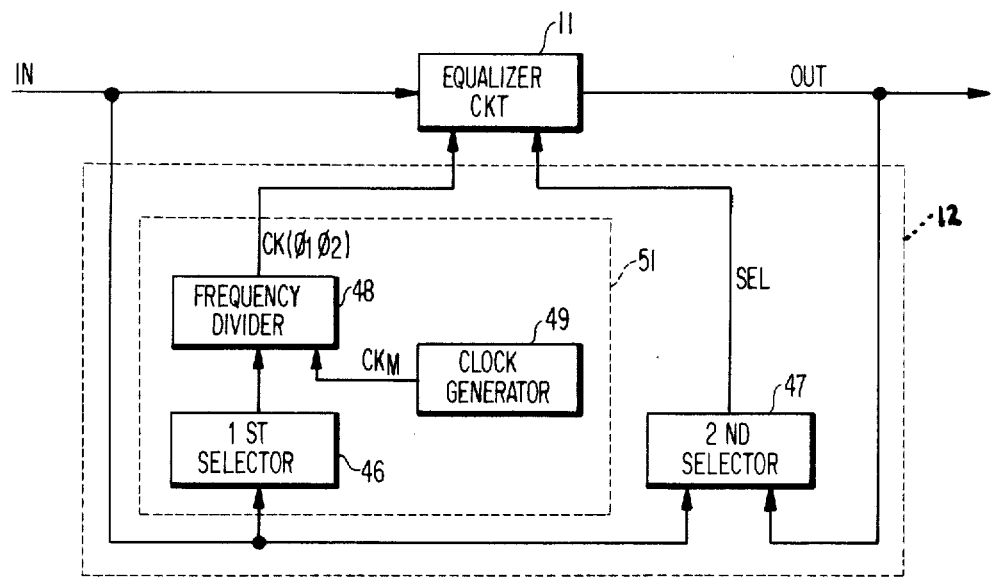
FIG. 1 is a block diagram of a line equalizer according to a first embodiment of this invention.
Figure 2:
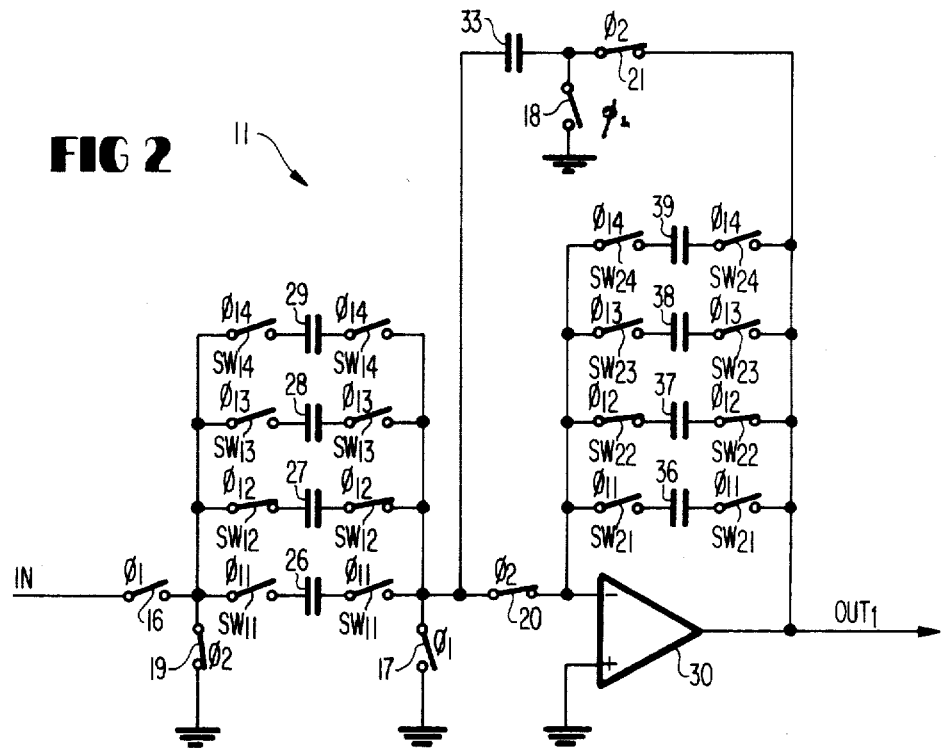
FIG. 2 is a circuit diagram of a switched capacitor circuit for use in the line equalizer illustrated in FIG. 1.

Referring to FIGS. 1 and 2, a line equalizer according to a first embodiment of this invention is supplied with an input signal IN through a subscriber line (not shown) to produce an equalizer output signal OUT. The signal has a data or bit rate which is determined by the subscriber line and which may be, for example, 3.2 kbs, 6.4 kb/s, 12.8 kb/s, 64 kb/s, 80 kb/s, or 200 kb/s. The line equalizer is operable even when the data rate of the input signal IN is changed, as will later become clear. The subscriber line has a line loss characteristic which depends upon the data rate of the input signal IN. The line loss characteristic is variable in dependence upon the length of the subscriber line, temperature, humidity, and the like.

The illustrated line equalizer has a plurality of frequency-gain characteristics, one of which is selected in consideration of the line loss characteristic and which may be substantially inverted relative to the line loss characteristic. More specifically, the line equalizer comprises an equalizer circuit 11 to be presently described in conjunction with FIG. 2 and a control circuit 12 for supplying the equalizer circuit 11 with a clock signal CK and a selection signal SEL in a manner to be described later.

In FIG. 2, the equalizer circuit 11 is implemented by a switched capacitor circuit in response to the input signal IN, the clock signal CK, and the selection signal SEL. The clock signal CK is delivered to the switched capacitor circuit in the form of a succession of first clock pulses $\phi_1$ having a first phase and a succession of second clock pulses $\phi_2$ having a second phase inverse relative to the first phase. Each of the first and the second clock pulses $\phi_1$ and $\phi_2$ has a clock frequency, namely, a repetition frequency determined by the data rate of the input signal IN.

The illustrated capacitor circuit comprises a first set of first through third switches 16, 17, and 18 and a second set of fourth through sixth switches 19, 20, and 21. The first through third switches 16 to 18 are opened and closed in response to the first clock pulse succession $\phi_1$ while the fourth through sixth switches 19 to 21 are operated in response to the second clock pulse succession $\phi_2$. Thus, the first-set switches 16 to 18 and the second-set switches 19 to 21 are alternatingly opened and closed. The first-set and the second-set switches 16 to 21 serve to sample the input signal IN in a known manner.

A first capacitor array is interposed between the first and the second switches 16 and 17 which are connected in common to the fourth and the fifth switches 19 and 20, respectively. The first capacitor array comprises first through fourth capacitors 26 to 29 selectively connected between the first and the second switches 16 and 17 through first to fourth switch pairs, respectively. Each of the switch pairs comprises two switches designated by the same reference symbol $SW_{11}$, $SW_{12}$, $SW_{13}$, or $SW_{14}$. The first through fourth switch pairs are selected by the selection signal SEL, provided as first through fourth switching signals $\phi_{11}$, $\phi_{12}$, $\phi_{13}$, and $\phi_{14}$ from the control circuit 12, respectively. At least one pair of the first through fourth switch pairs are simultaneously selected by the selection signal SEL.

The switched capacitor circuit comprises an operational amplifier 30 having a negative terminal (−) connected to the fifth switch 20, a positive terminal (+) grounded, and an output terminal for a circuit output signal $OUT_1$. In the example being illustrated, the circuit output signal $OUT_1$ is produced as the equalizer output signal OUT (FIG. 1).

An integrating capacitor 33 is inserted in a feedback loop between the output terminal and the negative terminal (−) of amplifier 30. The illustrated integrating capacitor 33 is connected at one terminal between the second and fifth switches 17 and 20 and at the other terminal between the third and the sixth switches 18 and 21. In addition, a second capacitor array is interposed between the output terminal and the negative terminal (−) of the operational amplifier 30 and comprises first through fourth additional capacitors 36 to 39 selectively connected between the output terminal and the negative terminal (−) through first through fourth additional switch pairs, respectively, each of which comprised two switches designated by the same reference symbol $SW_{21}$, $SW_{22}$, $SW_{23}$ or $SW_{24}$. The first through fourth additional switch pairs are selected by the first through fourth switching signals $\phi_{11}$, $\phi_{12}$, $\phi_{13}$, and $\phi_{14}$ provided as the selection signal SEL from the control circuit 12 (FIG. 1) to the equalizer circuit 11.

As readily understood from FIG. 2, it is possible to provide a plurality of frequency-gain characteristics using the first and the second capacitor arrays. Specifically, sixteen frequency-gain characteristics can be attained by selecting among the capacitors 26 to 29 and 36 to 39 from the first and the second capacitor arrays. A plurality of capacitors in each capacitor array may simultaneously be selected to provide additional frequency-gain characteristics. Accordingly, a great number of frequency-gain characteristics can be achieved by a small number of capacitors.

In order to control the above-mentioned equalizer circuit 11, the control circuit 12 supplies the selection signal SEL to the equalizer circuit 11 in consideration of the variable data rate of the input signal IN in a manner to be described. In other words, the selection signal SEL is varied in dependence upon the variation of the data rate of the input signal IN. In the example illustrated, the clock frequency of the clock pulse CK is also varied in consideration of the variable data rate of the input signal IN.

More particularly, the illustrated control circuit 12 comprises a first selector 46 and a second selector 47 each of which is supplied with the input signal IN. The first selector 46 comprises a measuring section (not shown) for measuring the data rate of the input signal IN to produce a data rate signal representative of the data rate, and a read-only memory (not shown) responsive to the data rate signal. The measuring portion may be implemented by a known circuit and will therefore not be further described. The read-only memory of the first selector 46 is loaded with a plurality of frequency indication signals which correspond to data rates used in various subscriber lines and which are indicative of frequencies of clock pulses for the respective data rates. One of the frequency indication signals is delivered from the first selector 46 to a frequency divider 48 supplied with a sequence of master clock pulses $CK_M$ from a clock generator 49. The master clock pulse sequence $CK_M$ is frequency divided by the frequency divider 48 into the clock signal CK, which is divisible into the first and the second clock pulse successions $\phi_1$ and $\phi_2$. Accordingly, the combination of the first selector 46, the frequency divider 48, and the clock generator 49 is operable to vary the frequency of the clock signal CK and form the clock signal controller 51.

For example, let the clock frequency of the clock signal CK be equal to $f_1$ when the input signal IN has a data rate of 200 kb/s. When the illustrated equalizer is used to receive an input signal IN having a data rate of 64 kb/s, the clock frequency $f_1$ of the clock signal CK is changed to $f_2$ given by:

$$f_2 = (64/200) \cdot f_1. \quad (1)$$

Each clock frequency $f_1$ or $f_2$ may be equal to four or eight times the data rate.

Such a change of the clock frequency brings about a shift of the frequency-gain characteristics along the frequency axis. However, the loss characteristic of each subscriber line is not always shifted along the frequency axis in dependency upon the variation of the data rate of the input signal IN. This gives rise to incoincidence between the frequency-gain characteristics of the equalizer and the loss characteristic and makes the eye aperture inevitably narrow in the eye pattern.

Under these circumstances, the selection signal SEL is produced by the second selector 47 in consideration of both the input and the output signals IN and OUT. As a result, the frequency-gain characteristics of the equalizer circuit 11 are varied from one to another in dependency upon the data rate of the input signal.

More specifically, the second selector 47 comprises a monitoring portion (not shown) for monitoring the output level of the equalizer output signal OUT, a measuring portion (not shown) similar to that described in conjunction with the first selector 46, and a read-only memory (not shown) accessible by the output signals of both the monitoring and the measuring portions. The monitoring portion may be operated in a manner similar to that known in conjunction with an automatic gain control circuit. The read-only memory of the second selector 47 is loaded with a plurality of selection signals corresponding to the frequency-gain characteristics of the equalizer circuit 11.

It will be readily understood that the selection signal SEL is changed in dependence upon the change of the data rate of the input signal IN and the output level of the equalizer output signal.

The illustrated equalizer may be used when the data rate is widely varied, to maintain a wide eye aperture in the eye pattern.

Figure 3:
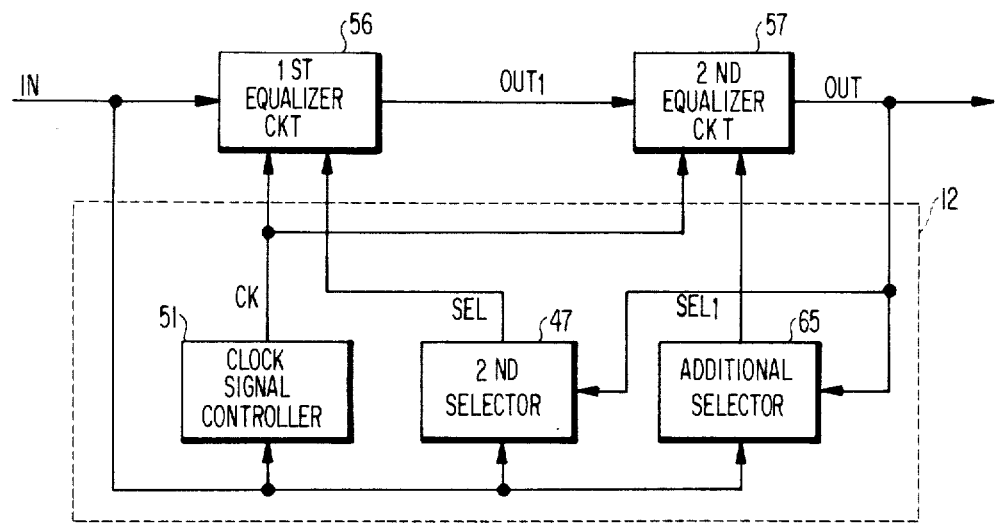
FIG. 3 is a block diagram of a line equalizer according to a second embodiment of this invention.

Referring to FIG. 3, a line equalizer according to a second embodiment of this invention comprises first and second equalizer circuits 56 and 57 connected in cascade with each other and controlled by a control circuit 12 in a manner to be described later. The first and the second equalizer circuits 56 and 57 may be implemented by a second-order and a first-order switched capacitor circuit, respectively. The second-order equalizer circuit itself is known in the art and will not be further described. The second equalizer circuit 57 may be similar in structure to the equalizer circuit 11 illustrated in FIG. 1.

Figure 4:
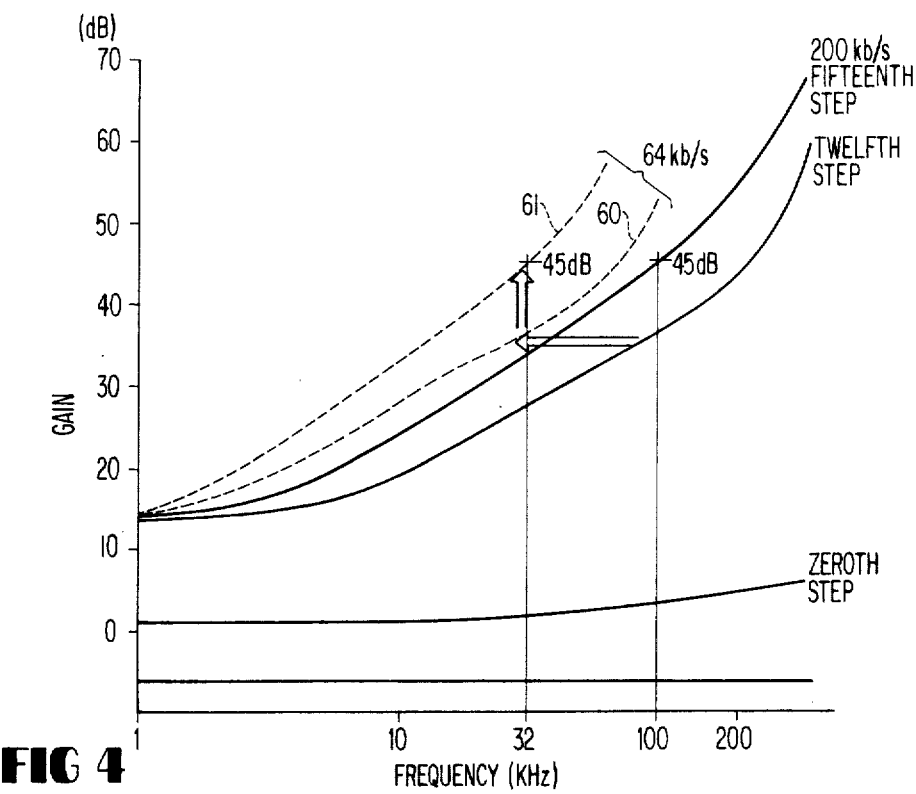
FIG. 4 is a graphical representation for use in describing the operation of a part of the line equalizer illustrated in FIG. 3.

Referring to FIG. 4 together with FIG. 3, the first equalizer circuit 56 has sixteen frequency-gain characteristics optimized for the data rate of 200 kb/s and classified into zeroth through fifteenth steps 0 to 15. The zeroth and the fifteenth steps 0 and 15 are determined to have a minimum and a maximum gain at a middle frequency of 100 kHz which is equal to half of the data rate, respectively. Consideration of the middle frequency is based on the fact that a bipolar signal is transmitted through each subscriber line and is received as the input signal IN. As shown in FIG. 4, the fifteenth step 15 has a gain equal to 45 dB at the middle frequency of 100 kb/s while the remaining steps have gains successively reduced by about 2.8 dB in descending order from the fourteenth step 14 to the zeroth step 0. This means that the gain difference between the fifteenth and the twelfth steps 15 and 12 is about 8.4 dB at the middle frequency of 100 kHz.

The gain of 45 dB is maintained at the fifteenth step even when the data rate is changed from 200 kb/s, for example, to 64 kb/s. In other words, the fifteenth step 15 determined for the data rate of 64 kb/s must have the gain of 45 dB at a middle frequency of 32 kHz.

When the clcok frequency is changed from 200 kHz to 64 kHz, it has been found that the fifteenth step determined for 200 kb/s is not preferable as the fifteenth step determined for 64 kb/s. Under the circumstances, the fifteenth step 15 for 200 kb/s is at first shifted to the twelfth step 12 for 200 kb/s, as shown by curve 60 in FIG. 4. The curve 60 has a gain lower than 45 dB by about 9 dB at middle frequency of 32 kHz.

The second equalizer circuit 57 is optimized for the data rate of 64 kb/s and is used to increase the gain to 45 dB at the middle frequency of 32 kHz to provide a favorable frequency-gain characteristic which is shown by curve 61.

Similar operations are carried out in relation to the remaining steps 14 to 0 by shifting each step by three steps and then augmenting the gain in the second equalizer circuit 57.

Figure 5:
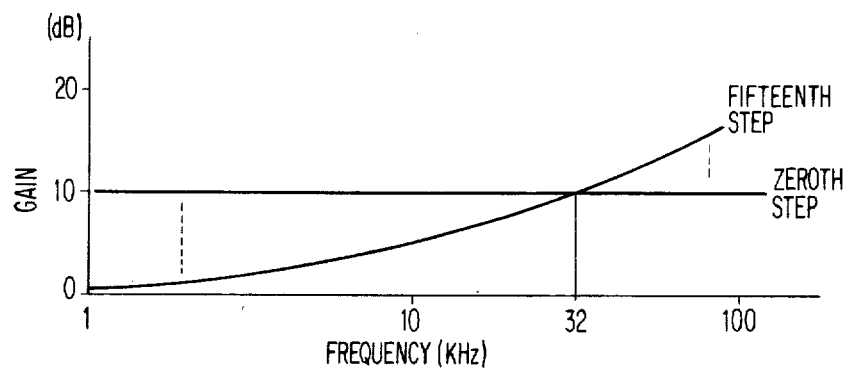
FIG. 5 is another graphical representation for use in describing the characteristics of another part of the line equalizer illustrated in FIG. 3.

Temporarily referring to FIG. 5, the second equalizer circuit 57 has additional frequency-gain characteristics determined for the zeroth through fifteenth steps of 64 kb/s, as illustrated in FIG. 5, and is operable only when the data rate is lower than 200 kb/s. In other words, the second equalizer circuit 57 allows the an input signal IN of 200 kb/s to pass therethrough and is kept in an inactive state.

As shown in FIG. 5, the second equalizer circuit 57 serves to compensate for a reduction in gain which results from shifting each step by three steps. In addition, the second equalizer circuit 57 also serves to compensate for the inclination of each curve, such as the curve 61.

In FIG. 5, it is seen that the gain for the fifteenth step 15 is about 10 dB at the middle frequency of 32 kHz and that the curve 60 (FIG. 4) is favorably modified into curve 61.

Referring back to FIG. 3, the first equalizer circuit 56 supplies the second equalizer circuit 57 with the circuit output signal $OUT_1$ while the second equalizer circuit 57 produces the equalizer output signal OUT in response to the circuit output signal $OUT_1$. Accordingly, the second equalizer circuit 57 is operable to produce the equalizer output signal OUT and will by designated as the signal producing circuit.

The control circuit 12 comprises a clock signal controller which is similar to that illustrated in FIG. 1 and is designated again by the reference numeral 51. That is, the clock signal controller 51 is a combination of a first selector 46, a frequency divider 48, and a clock generator 49. The illustrated clock signal controller 51 delivers the clock signal CK to the first and the second equalizer circuits 56 and 57 in the manner described in conjunction with FIG. 3. The second equalizer circuit 57 may be supplied with the clock signal CK only when the data rate of the input signal IN is lower than 200 kb/s. The clock signal CK delivered to the second equalizer circuit 57 may be designated as an additional clock signal. The clock signal CK has a clock frequency determined by the data rate of the input signal IN. For example, the clock frequency of the clock signal CK is given by Equation (1) when the data rate is changed from 200 kHz to 64 kHz.

Like in FIG. 1, the second selector 47 is operable in response to both the input signal IN and the equalizer output signal OUT to deliver the selection signal SEL to the first equalizer circuit 56. In this event, each combination of the data rate of the input signal IN and the output level of the equalizer output signal OUT specifies a selected one of the sixteen steps determined for the data rate of 200 kb/s in the manner described in conjunction with FIG. 4. In other words, the selected step is shifted relative to the steps determined for the data rate of 200 kb/s.

In FIG. 3, an additional selector 65 is included in the control circuit 12 and is supplied with the input signal IN and the equalizer output signal OUT. Like the first and the second selectors 46 and 47, the additional selector 65 comprises a monitoring portion for monitoring the output level of the equalizer output signal OUT, a measuring portion for measuring the data rate of the input signal IN, and a read-only memory storing a plurality of additional selection signals $SEL_1$ for selecting the additional frequency-gain characteristics of the second equalizer circuit 57. In the example illustrated, the number of the additional frequency-gain characteristics is equal to sixteen.

Each additional selection signal $SEL_1$ is sent from the additional selector 65 to the second equalizer circuit 57 to equalize the circuit output signal $OUT_1$ in accordance with a selected one of the additional frequency-gain characteristics of the second equalizer circuit 57 in the manner illustrated in FIG. 5.

The equalizer illustrated in FIG. 3 may be used when the data rate is variable in a wide rate range and a wide eye aperture is not required.

Figure 6:
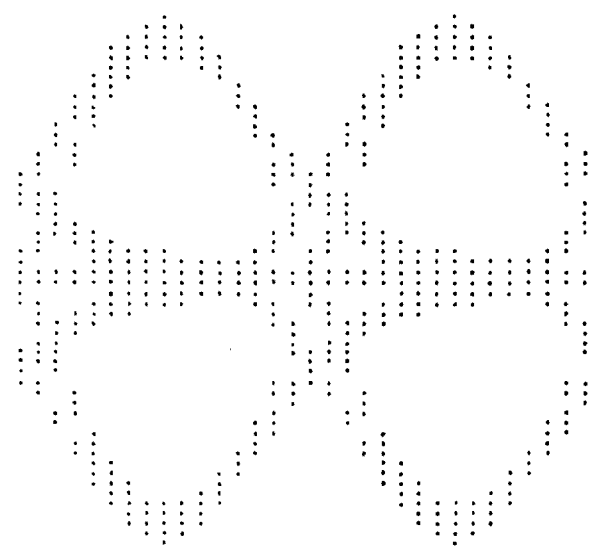
FIG. 6 shows an eye pattern for use in describing a characteristic of the line equalizer illustrated in FIG. 3.
Figure 7:
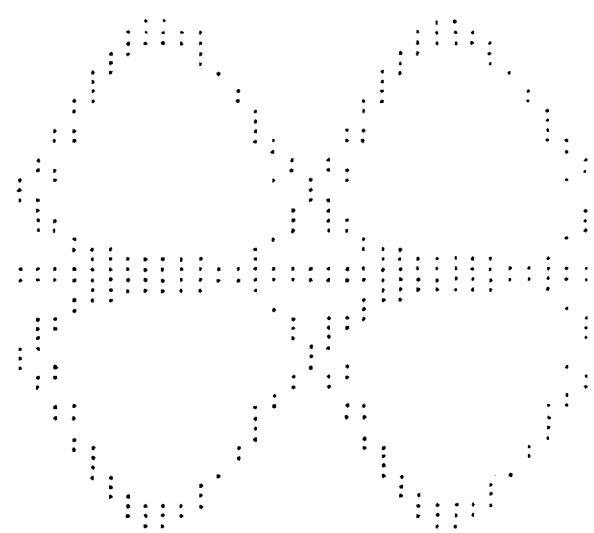
FIG. 7 shows another eye pattern for use in describing another characteristic of the line equalizer illustrated in FIG. 3.

Referring to FIGS. 6 and 7, eye patterns are illustrated to show the optimization of the equalizer illustrated in FIG. 3 and to show the results of simulation. It is assumed that the first equalizer circuit 56 is operable at each of zeroth through the fifteenth steps determined for the data rate of 200 kb/s and that the second equalizer circuit 57 is optimized for the data rate of 64 kb/s. In FIGS. 6 and 7, the first equalizer circuit 56 is operated to determine which one of the steps determined for the data rate of 200 kb/s is optimum as a fourteenth step determined for the data rate of 64 kb/s.

The fourteenth step determined for the data rate of 200 kb/s is selected in FIG. 6 as the fourteenth step determined for the data rate of 64 kb/s while the eleventh step determined for the data rate of 200 kb/s is selected in FIG. 7 as the fourteenth step determined for the data rate of 64 kb/s.

As readily understood from comparison of FIGS. 6 and 7, an eye aperture of the eye pattern illustrated in FIG. 7 is greater or wider than that of the eye pattern illustrated in FIG. 6. Accordingly, it is preferable that the steps determined for the data rate of 200 kb/s are shifted in order to receive the input signal IN of a different data rate.

Figure 8:
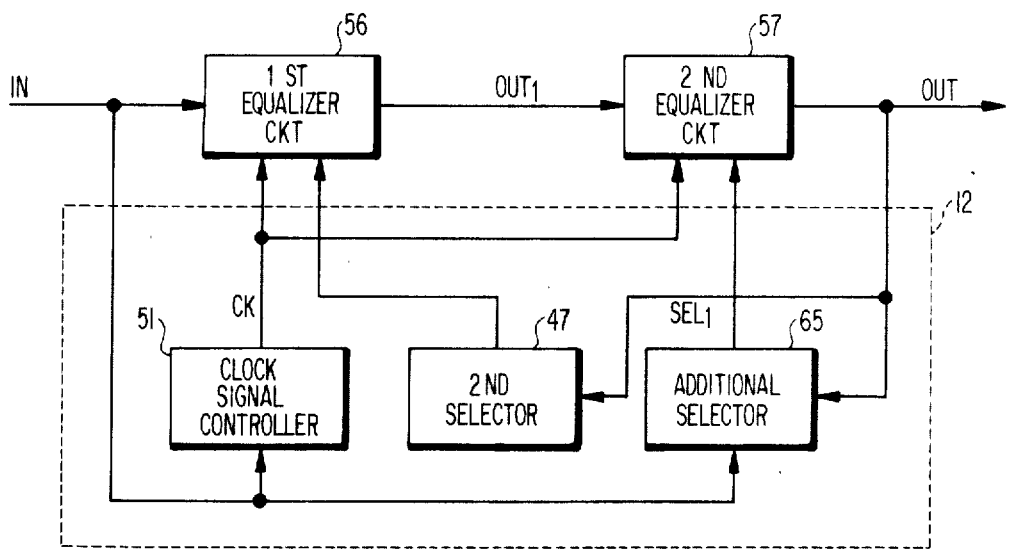
FIG. 8 is a block diagram of a line equalizer according to a third embodiment of this invention.

Referring to FIG. 8, a line equalizer according to a third embodiment of this invention is similar to that illustrated in FIG. 3 except that the second selector 47 (FIG. 8) is supplied with the equalizer output signal OUT alone. With this structure, it is possible to favorably produce the selection signal SEL in a manner similar to that illustrated in FIG. 3. The line equalizer illustrated in FIG. 8 may be used in the case where the data rate is variable within a comparatively narrow rate range and the eye aperture must be wide.

While this invention has thus far been described in conjunction with a few embodiments thereof, it will readily be possible for those skilled in the art to put this invention into practice in various other manners.

What is claimed is:

1. A line equalizer operable in response to an input signal of a variable data rate to produce an equalizer output signal, said line equalizer comprising:

control means responsive to said input signal for producing clock signals having a frequency variable in accordance with said variable data rate;

a first switched capacitor circuit receiving said input signal and coupled to said control means, for producing a circuit output signal, said first switched capacitor circuit comprising a first capacitor array of a first set of capacitors and sampling means responsive to said clock signals for sampling said input signal at a sampling rate determined in relation to said variable data rate, said first switched capacitor circuit having a plurality of first frequency-gain characteristics which are classified into a plurality of steps for equalization of said input signal and which are determined by controlling said first capacitor array;

a second switched capacitor circuit receiving said circuit output signal and coupled to said control means, for producing said equalizer output signal, said second switched capacitor circuit having a plurality of second frequency-gain characteristics which are classified into a plurality of additional steps for compensation of said circuit output signal;

first signal generating means responsive to said input signal and said equalizer output signal for delivering a first selection signal to said first capacitor array to select said first frequency gain characteristics in accordance with both said variable data rate and an output level of the equalizer output signal and to shift the selected one of the first frequency-gain characteristics with reference to the variation of said variable data rate of the input signal; and second signal generating means responsive to said input signal and said equalizer output signal for delivering a second selection signal to said second switched capacitor circuit to control said second frequency-gain characteristics with reference to the output level of said equalizer output signal and said variable data rate.

2. A line equalizer as claimed in claim 1, wherein said control means comprises clock control means responsive to said input signal for delivering said clock signals to said first and said second equalizer circuits at a clock rate dependent upon said variable data rate of said input signal.

3. A line equalizer as claimed in claim 2, wherein said clock control means includes third signal generating means responsive to said input signal for selecting said clock rate, and frequency divider means for dividing a clock signal so as to obtain said selected clock rate.

* * * * *

UNITED STATES PATENT AND TRADEMARK OFFICE
CERTIFICATE OF CORRECTION

PATENT NO. : 4,686,686

DATED : August 11, 1987

INVENTOR(S) : Kenji Nakayama et al

It is certified that error appears in the above-identified patent and that said Letters Patent is hereby corrected as shown below:

Column 2, line 32, after "the" insert --input--

Column 2, line 34, after "3.2" delete "kbs" insert --kb/s--

Column 2, line 55, after "circuit" insert --operable--

Column 3, lines 43-44, delete "comprised" insert --comprises--

Column 6, line 14, delete "by" insert --be--

Signed and Sealed this

Fifth Day of July, 1988

Attest:

DONALD J. QUIGG

Attesting Officer

Commissioner of Patents and Trademarks